United States Patent
Shupe et al.

(10) Patent No.: US 6,771,950 B1
(45) Date of Patent: Aug. 3, 2004

(54) METHOD AND SYSTEM FOR A WIRELESS SUBSCRIBER TO INITIATE A CALLING PARTY NUMBER TRACE

(75) Inventors: Lester B. Shupe, Broomfield, CO (US); Kerry Neilson, Boulder, CO (US)

(73) Assignee: Qwest Communications International Inc., Denver, CO (US)

( * ) Notice: Subject to any disclaimer, the term of this patent is extended or adjusted under 35 U.S.C. 154(b) by 698 days.

(21) Appl. No.: 09/660,069

(22) Filed: Sep. 12, 2000

(51) Int. Cl.[7] .............................................. H04Q 7/20
(52) U.S. Cl. ................. 455/414.1; 455/415; 379/32.05
(58) Field of Search ................................. 455/404, 406, 455/410, 411, 412, 414, 415, 433, 435, 567; 379/32.01, 32.05, 35

(56) References Cited

U.S. PATENT DOCUMENTS

| | | | | | |
|---|---|---|---|---|---|
| 3,997,732 | A | * | 12/1976 | Every et al. ................ | 379/360 |
| 4,591,665 | A | * | 5/1986 | Foster et al. ............ | 379/142.01 |
| 6,009,321 | A | * | 12/1999 | Wang et al. ................. | 455/410 |
| 6,243,458 | B1 | * | 6/2001 | Fellner et al. ............... | 379/247 |
| 6,459,893 | B2 | * | 10/2002 | Pentikainen .............. | 455/414.1 |
| 6,473,620 | B1 | * | 10/2002 | Park et al. .................. | 455/458 |
| 6,496,691 | B1 | * | 12/2002 | Easley et al. ............... | 455/415 |

FOREIGN PATENT DOCUMENTS

EP           0 967 775 A2 * 12/1999

* cited by examiner

*Primary Examiner*—Jean Gelin
(74) *Attorney, Agent, or Firm*—Townsend and Townsend and Crew LLP

(57) ABSTRACT

A method and system for a wireless subscriber to initiate a calling party number trace includes receiving a Location Request Message at a Service Location Register for an inbound call to a subscriber, the message including Calling Party Information. If the subscriber has a Customer Originated Trace (COT) feature, the Calling Party Information is temporarily stored in a database. A Mobile Switching Center receives a feature code corresponding to a subscriber COT request and generates a Feature Request message. If it is determined that the subscriber has the COT feature and Calling Party Information temporarily stored in the database, the Calling Party Information is permanently stored for later retrieval.

5 Claims, 4 Drawing Sheets

METHOD AND SYSTEM FOR A WIRELESS SUBSCRIBER TO INITIATE A CALLING PARTY NUMBER TRACE

TECHNICAL FIELD

This invention relates to a method and system for a subscriber to initiate a calling party number trace to record prior calls such as harassing telephone calls.

BACKGROUND ART

A wireless communication system is shown in FIG. 1 and designated generally by reference 10. Wireless network 10 includes a Central Office Switch (COS) 12 which, in an Advanced Intelligent Network (AIN), may comprise a Service Switching Point (SSP). COS 12 is provided in communication with the Public Switched Telephone Network (PSTN) 14 and one or more subscribers, each having at least one Customer Premises Equipment (CPE) 16 device such as a telephone. COS 12 is further provided in communication with a Mobile Switching Center (MSC) 20 and an Intelligent Peripheral (IP) 22. MSC 20 is, in turn, provided in communication with IP 22, a Home Location Register (HLR) 24 and one or more Base Station Controllers (BSGs) 26. Each BSC 26 is provided in communication with one or more Base Stations (BSs) 28. Finally, each BS 28 is provided in communication with one or more mobile handsets 30, each having an assigned calling number known as a Mobile Directory Number (DN) or Mobile Identification Number (MIN). Each handset is also assigned an Electronic Serial Number (ESN).

In an Advanced Intelligent Network, COS 12 may comprise an SSP which is generally a node, usually the Subscriber's Local Switch/Central Office Switch or an access tandem (Long-Distance) switching office which recognizes the triggers generated when a subscriber's service invokes an Intelligent Network Trigger and then communicates with an SCP to operate the service. An SCP is a node which contains the service logic and associated data support including a network configuration and call completion database to execute the required customer services. A Service Switching Point is generally provided in communication with one or more Signal Transfer Points (STPs) which are packet switches used to route signaling messages within the network. In limited traffic situations, Service Switching and Control Points (SSCPs) may also be provided for combining the functions of the SCP and SSP respectively.

As those skilled in the art will recognize, the above components comprise the common channel signaling system No. 7 (CCSS7) which is an end-to-end signaling system designed for use primarily in high speed digital networks. The CCSS7 is capable of accommodating low-speed analog facilities as well. It typically operates at 64 Kbps and can support variable message lengths up to approximately 2,176 bits (272 octets) of information per message. New network services are typically installed on at least two SCP platforms for directly servicing a selected market. The CSS7 Network extends management and control to remote SCPs 18/adjuncts.

In operation, a call to a mobile subscriber having handset 30 and a preassigned Mobile Identification Number (MIN), and Electronic Serial Number (ESN), is forwarded through the Public Switched Telephone Network (PSTN) 14 to COS 12. Once received at COS 12, performs a database lookup and identifies the called party directory number as a MIN which corresponds to a specific mobile subscriber and handset 30. COS 12 then forwards the call to the subscriber's home MSC 20. As recognized, in the example given, the subscriber's home MSC and serving MSC are the same. However, in operation, it is anticipated that the subscriber's serving MSC may be a different MSC such as, for example, when the subscriber is out of her home coverage area and "roaming" on another wireless network.

The serving MSC, here MSC 20, will thereafter launch a query to HLR 24 requesting the location of handset 30, as well as call termination parameters including the subscriber's profile or call feature set. MSC will also request a Temporary Location Number (TLN) assigned to subscriber 30 if the subscriber is currently roaming on another network. This request, termed a Location Request Message (LOCREQ) typically includes information such as Calling Party Identification, (the calling party directory numbers) Called Party Identification (the subscriber's (DN or MIN) and Redirecting Party Information. As those skilled in the art will recognize, in the case of roaming, a subscriber's MIN is replaced with a temporary location number (TLN) assigned to the serving MSC. For purposes of this application, however, the terms DN, MIN and TLN will be used interchangeably all referring to a subscriber's telephone number.

As indicated above, the location request message generated in response to an inbound call to a mobile subscriber includes calling party identification. That is, it includes the telephone number or calling party number of the person who placed the call. In contrast to the wireline network where this calling party information is forwarded through the network to the serving central office of the called party, the calling party information in a wireless network terminates at the last serving wireline switch and does not get passed on to the wireless portion of the network. In a wireline network, if a calling party inhibits the calling party information, i.e. the calling number, by entering a * code or otherwise, the calling party information is still forwarded to the serving central office switch. Accordingly, if the subscriber or law enforcement personnel wish to obtain this calling party information, they may do so. In a wireless network, however, calling party information cannot be obtained if the calling party has inhibited it.

Consequently, a need has developed for a method and system for a subscriber to originate a calling party number trace.

DISCLOSURE OF INVENTION

It is a principle object of the present invention to provide a method and system for a subscriber to originate a calling party number trace in a wireless communication network.

In carrying out the above object, the method is specifically adapted for use in a wireless communication system which includes a switching center such as a mobile switching center (MSC), a Service Location Register such as a Home Location Register (HLR) and a plurality of subscribers, each assigned a Mobile Identification Number (MIN). The method includes receiving at the switching center a request from a subscriber for a calling party number trace. Thereafter, the calling number of a previous call to the subscriber is determined based on the subscriber's MIN. Finally, the calling party number is stored in the service location register.

In carrying out the above method, there is provided a wireless communication system operative to permit subscriber originated calling party number traces. The system includes a Mobile Switching Center (MSC) in communication with a plurality of subscribers as well as a Service Location Register such as a Home Location Register (HLR) having a data base. The Service Location Register, preferably, but not necessarily, a Home Location Register, is operative to both temporarily and permanently store calling party information preferably calling party number, date and time in the HLR data base. In this manner, calling party information regarding a harassing calling party may be stored and provided to law enforcement personnel. The above objects and other objects, features and advantages of the present invention will become more readily apparent by reference to the following detailed description of the drawings wherein like reference numerals correspond to like components.

BEST MODE FOR CARRYING OUT THE INVENTION

Figure 1:
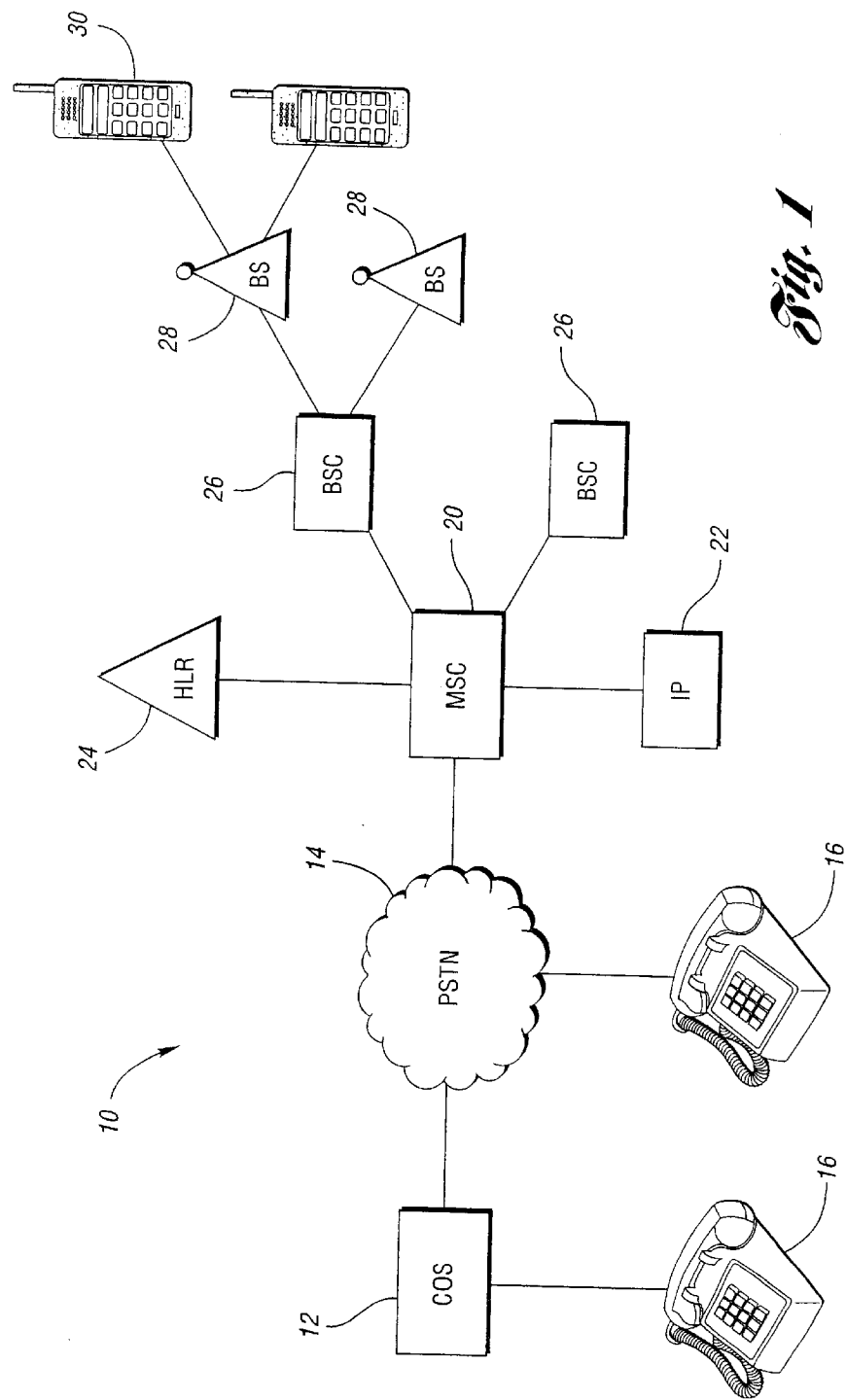
FIG. 1 is a schematic diagram of a prior art wireless communication system.
Figure 2:
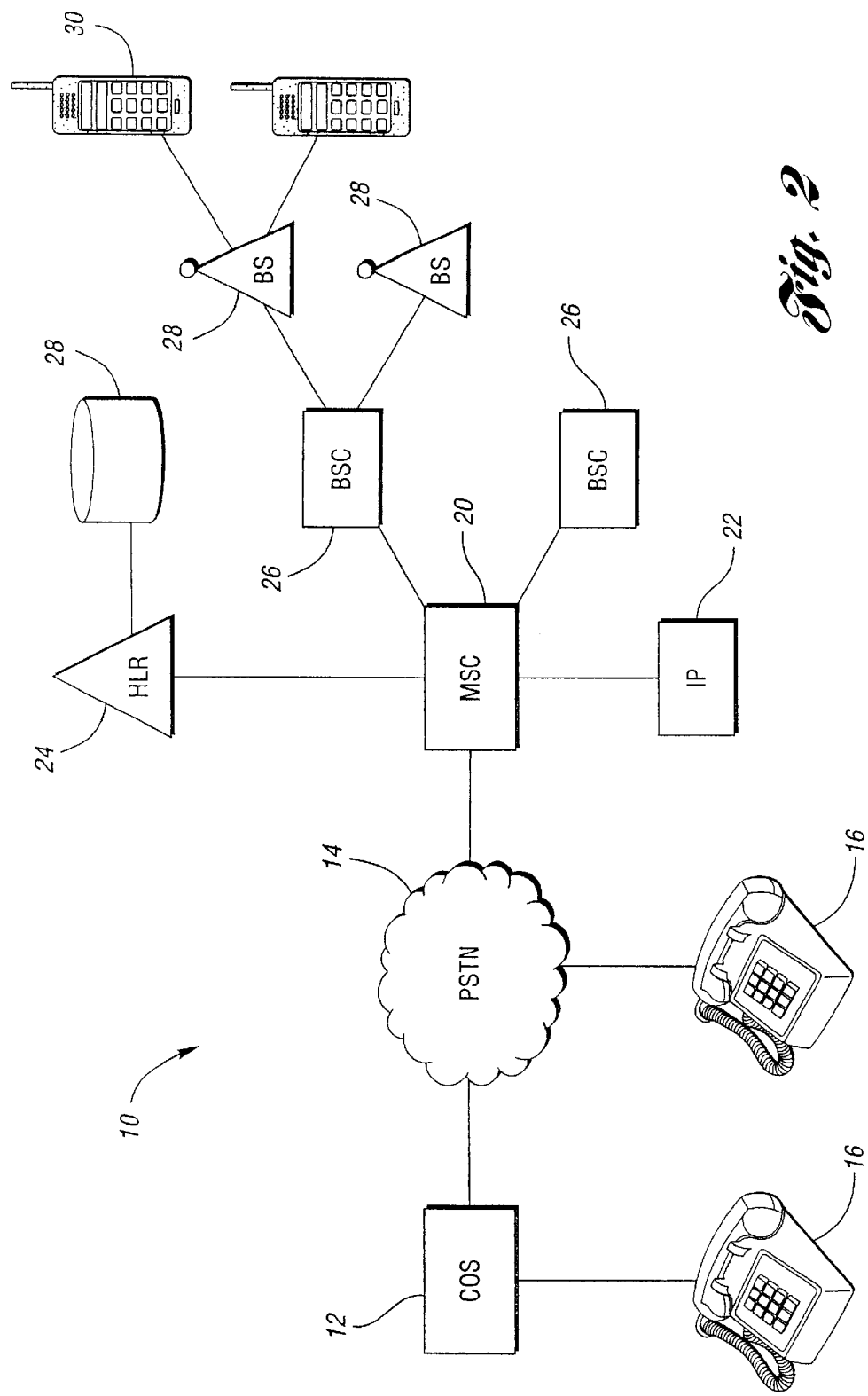
FIG. 2 is a schematic diagram of a wireless communication system adapted to carry out the objectives of the present invention.

With reference to FIG. 2 of the drawings, the best mode for carrying out the present invention may be described in further detail. As indicated above, in operation, a call to a mobile subscriber having handset 30 and a preassigned Mobile Identification Number (MIN) or Mobile Directory Number (MDN) is routed through the Public Switched Telephone Network (PSTN) 14 to a serving central office 12. Upon receipt, the serving central office performs a data base look up and identifies the called party directory number has a MIN which corresponds to a specific mobile subscriber and handset 30. The serving central office then routes the call to the subscriber's home mobile switching center, here MSC 20. MSC 20 launches a query to a service location register such as, for example, HLR 24, requesting the location of handset 30 as well as call termination parameters.

In keeping with the invention, the service location register, HLR 24 is adapted to determine if the calling party, i.e. the telephone subscriber has a Customer Originated Trace (COT) feature. If so, the service location register temporarily stores calling party information in the HLR and, more preferably, an HLR data base. While it is anticipated that the calling party information may comprise any suitable information, in the preferred embodiment, the calling party information includes at least calling party number and, more preferably, date and time of call.

As recognized by those skilled in the art, once a location request message has been generated, the serving MSC requests a temporary location number which has been assigned by a serving MSC to subscriber 30. The call is then routed through the wireline network and to the wireless network and terminated to the called party. In the event the called party has received a harassing phone call or, for whatever reason, desires to store calling party information regarding the calling party, the subscriber may enter a feature code such as a *code for receipt by the serving MSC. Typically, such a code will be generated for the use of a Dual Tone Multi Frequency (DTMF) entry. Upon receipt of a feature code, the MSC will generate a feature request message for receipt by the service location register HLR 24. Thereafter, based on the subscriber's MIN, the service location register will determine if the subscriber has both the COT feature and valid calling information temporarily stored in the HLR. Again, in the preferred embodiment, the calling party information includes at least calling party number and, more preferably, date and time. Therefore, in such case, the service location register will determine if the subscriber has the COT feature and a valid calling party number stored in the HLR. If the subscriber has the COT feature and a valid calling party number temporarily stored in the HLR data base, this information will be permanently stored in the data base.

Figure 3:
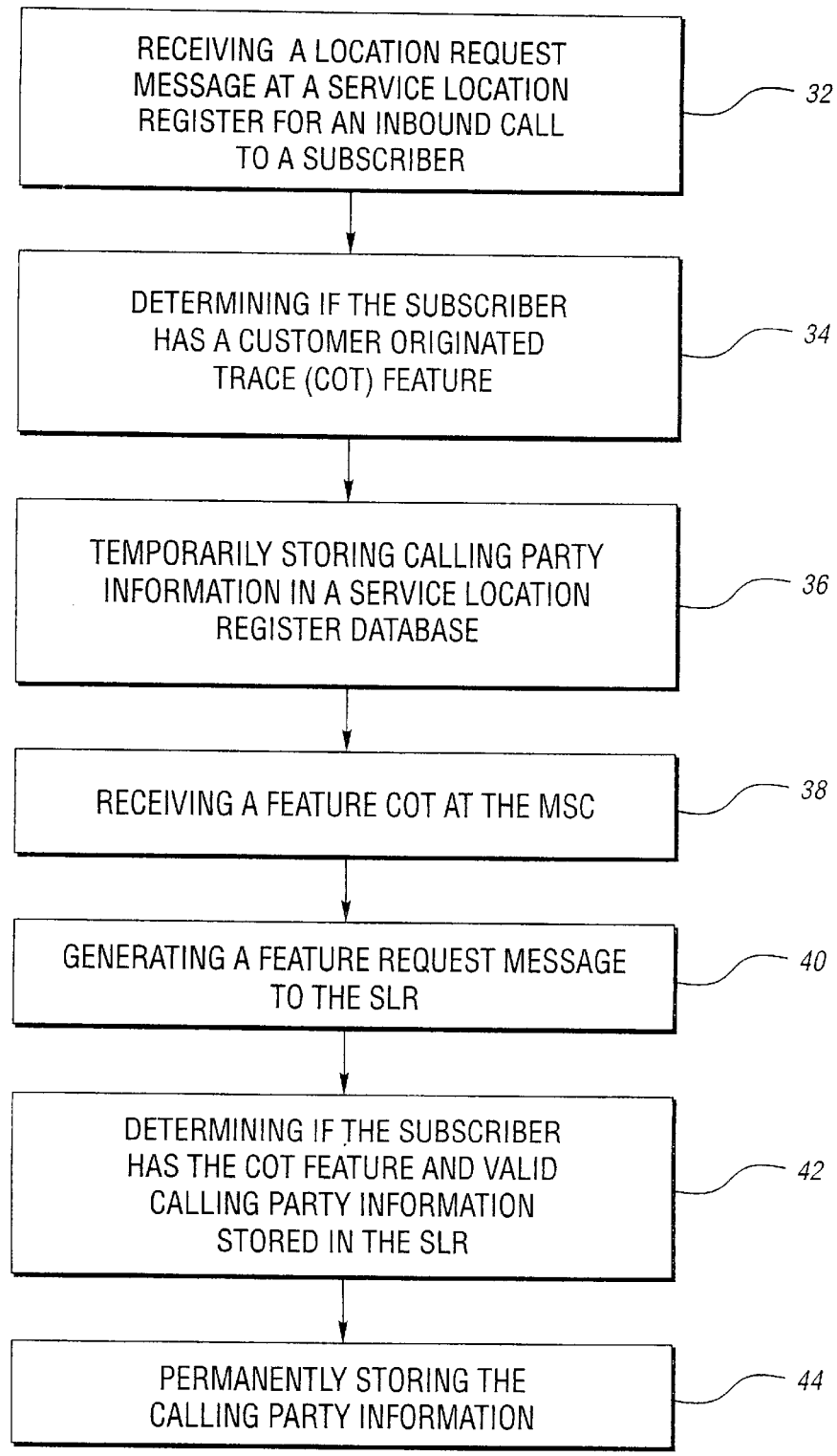
FIG. 3 is a block diagram of the method steps of the present invention.
Figure 4:
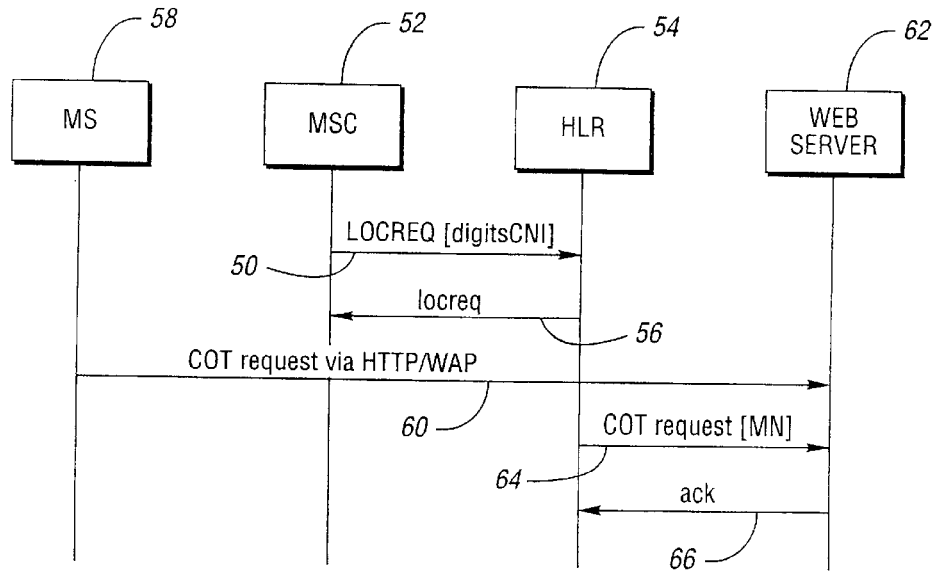
FIG. 4 is a data flow diagram of one embodiment of a method of the present invention.
Figure 5:
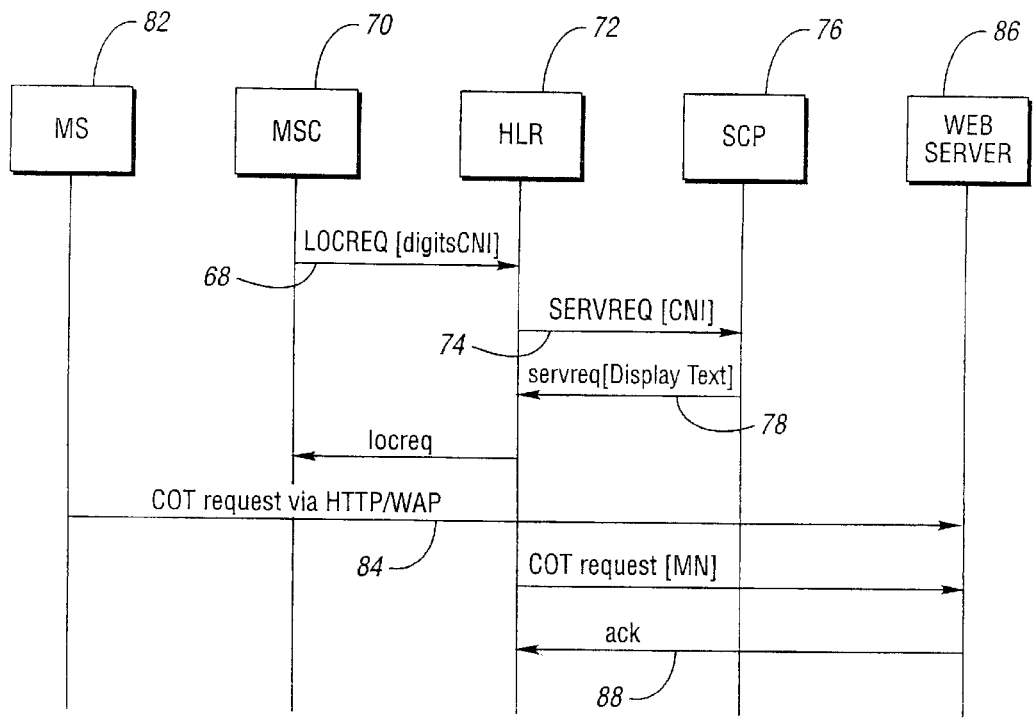
FIG. 5 is a data flow diagram of one embodiment of a method of the present invention.

Referring now to FIG. 3 of the drawings, the method steps of the present invention will be further described. As shown, the method comprises receiving 32 a location request message at a Service Location Register for an inbound call to a subscriber. The method further includes determining 34 if the subscriber has a Customer Originated Trace (COT) feature. If the subscriber has the COT feature, the method further comprises temporarily storing 36 calling party information in the SLR data base. Thereafter, the method comprises receiving 38 a feature code at the MSC. The feature code corresponds to subscriber COT request. Still further, the method includes generating 40 a feature request message at the MSC for receipt by the SLR and determining 42 based on the subscriber's MIN if the subscriber has this COT feature and a valid calling party number temporarily stored in the HLR. Finally, if the subscriber has this COT feature and a valid calling party number temporarily stored in the HLR, the method comprises permanently storing 44 the calling party number in a datalog such as a data base.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. For use in a wireless communication system including a Mobile Switching Center (MSC), a Home Location Register (HLR) having a database, and a plurality of subscribers, each subscriber assigned a Mobile Identification Number (MIN), a method for a subscriber to originate a Calling Party number trace, comprising:

receiving a Location Request Message (LOCREQ) at the HLR for an inbound call to a subscriber, the LOCREQ including Calling Party Information;

determining if the subscriber has a Customer Originated Trace (COT) feature;

if the subscriber has the COT feature, temporarily storing the Calling Party Information in the HLR database;

receiving a feature code at the MSC, the feature code corresponding to a subscriber COT request;

generating a Feature Request message at the MSC for receipt by the HLR;

determining based on the subscriber's MIN if the subscriber has the COT feature and Calling Party Information temporarily stored in the HLR, and;

if the subscriber has the COT feature and a Calling Party Information temporarily stored in the HLR database, permanently storing the Calling Party Information in the database.

2. A method as in claim 1 wherein the Calling Party Information comprises Calling Party Number.

3. A method as in claim 1, wherein the Calling Party Information comprises date and time of call.

4. For use in a wireless communication system including a Mobile Switching Center (MSC), a Home Location Register (HLR), having a database, and a plurality of subscribers, each subscriber assigned a Mobile Identification Number (MIN), a method for a subscriber to originate a calling party number trace, comprising:

receiving a Location Request Message (LOCREQ) at the HLR for an inbound call for a subscriber, the LOCREQ including calling party number;

determining if the subscriber has a Customer Originated Trace (COT) feature;

if the subscriber has the COT feature, temporarily storing the calling party number, date and time in the HLR database;

receiving a feature code at the MSC, the feature code corresponding to a subscriber COT request;

generating a feature request message at the MSC for receipt by the HLR;

determining based on the subscriber's MIN if the subscriber has this COT feature and a valid calling party number temporarily stored in the HLR;

and if the subscriber has the COT feature and a valid calling party number temporarily stored in the HLR, permanently storing the calling party number, date and time, in the HLR.

5. A wireless communication system, comprising:

a Mobile Switching Center (MSC); and a Home Location Register (HLR) in communication with the MSC, the HLR having a database and operative to:

(a) temporarily store calling party information in the database in response to a location request for an inbound call to a subscriber having a Customer Originated Trace (COT) feature;

(b) in response to a feature request message, determining based on a subscriber's Mobile Identification Number if the subscriber has the COT feature and calling party information temporarily stored in the HLR database; and (c) where the subscriber has the COT feature and calling party information temporarily stored in the HLR database, permanently storing the calling party information in the database.

* * * * *